United States Patent
Klassen et al.

(10) Patent No.: US 6,483,606 B1
(45) Date of Patent: Nov. 19, 2002

(54) ERROR DIFFUSION ON MODERATE NUMBERS OF OUTPUT COLORS

(75) Inventors: R. Victor Klassen, Webster, NY (US); Brian L. Waldron, Penfield, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/140,219

(22) Filed: Aug. 26, 1998

(51) Int. Cl.$^7$ .............. G06K 15/00; G06K 9/00
(52) U.S. Cl. ............ 358/1.9; 358/529; 358/3.03; 382/167
(58) Field of Search ............ 358/1.9, 516, 518, 358/529, 530, 463, 3.03; 382/167, 298

(56) References Cited

U.S. PATENT DOCUMENTS

| | | | |
|---|---|---|---|
| 5,070,413 A | 12/1991 | Sullivan et al. | 358/456 |
| 5,087,981 A | 2/1992 | Ng et al. | 358/459 |
| 5,162,860 A | * 11/1992 | Nami | 355/327 |
| 5,432,893 A | 7/1995 | Blasubramanian et al. | 395/131 |
| 5,561,751 A | 10/1996 | Wong | 395/131 |
| 5,594,558 A | 1/1997 | Usami et al. | 358/518 |
| 5,621,545 A | 4/1997 | Motta et al. | 358/518 |
| 5,621,546 A | 4/1997 | Klassen et al. | 358/536 |
| 5,982,992 A | * 11/1999 | Waldron | 395/109 |

\* cited by examiner

*Primary Examiner*—Jerome Grant, II
(74) *Attorney, Agent, or Firm*—Fay, Sharpe, Fagan, Minnich & McKee, LLP

(57) ABSTRACT

A method of error diffusion selects colorants, from a plurality of colorants defining a color space, to obtain an actual color which represents a desired color for respective pixels. The actual colors are output by an output apparatus. The process first determines the desired color for a pixel. Next, undercolor removal is performed for the desired color, thereby dividing the desired color into first and second components. A scalar error diffusion is then performed for the first component of the desired color, resulting in a first component of the actual color. A vector error diffusion is performed for the second component of the desired color. The vector error diffusion calculates an error as a negative of a distance in the color space between a closest available colorant in a subset of the plurality of colorants and the desired color. The error is added to the desired color to obtain a second component of the actual color. The first and second components of the actual color are combined to achieve the final actual color. The final actual color is output to a color output apparatus.

18 Claims, 3 Drawing Sheets

ERROR DIFFUSION ON MODERATE NUMBERS OF OUTPUT COLORS

CROSS REFERENCE TO RELATED APPLICATION

Attention is directed to co-pending U.S. application Ser. No. 08/924,734 filed Sep. 5, 1997 in the name of Brian L. Waldron and entitled "Error Diffusion in Color Printing Where an Intra-Gamut Colorant is Available". The above-identified application is commonly assigned to the assignee of the present invention.

BACKGROUND OF THE INVENTION

The present invention relates to color printing, and in particular to color printing in which a small set of colorants, such as inks, are placed on a sheet in a manner to create a large range of apparent colors. The present invention is most useful in digital printing devices, such as xerographic or ink-jet printers.

Digital halftoning is the process of converting a continuous tone image to bi-level. Many output devices, including many printers and some cathode ray tube ("CRT") and liquid crystal display ("LCD") based devices are intrinsically bi-level. In other words, the process only prints or displays a dot or the process does not print or display a dot. Thus, a variety of geometrical patterns are created such that a group of dots and blank areas represent the continuous tone image as closely as possible. Because the halftoned image is only an approximate representation of the continuous tone image, there are differences between the continuous tone image and the halftone image. Those areas of the halftone pattern which do not match the original image are noise or error. An objective of much research in digital halftoning is reducing the amount of visible noise.

There are two broad classifications of digital halftoning: conventional, passive halftoning and active halftoning. Conventional, passive halftoning yields an appearance that is similar to that provided by classical analogue processes developed before digital techniques were available. It is most appropriate for devices that cannot display isolated pixels. Active halftoning typically implements some type of error diffusion to produce an image having a more pleasing appearance. Images created using error diffusion tend to have noise at higher and, hence, less visible spatial frequencies. Error diffusion is most appropriate for devices that can display isolated pixels.

Digital printing devices implementing halftoning technology, such as electrophotographic laser printers and ink-jet printers, are well known. In color digital printing devices, a small set of primary colorants, typically black, yellow, magenta, and cyan, are selectably placed in different areas on a print sheet. Small areas of each primary colorant are then optically blended together to create a large range (i.e., gamut) of colors which would be apparent to an observer.

Error diffusion allows a large gamut of colors to be obtained from a small number of colorants in a halftoned image. In order to print a small area of a desired source color using error diffusion, the source color is located in color space relative to the locations of the primary colorants, such as cyan, magenta, yellow, and black. The colorant which is closest to the target color in color space is then selected for one pixel. However, the error, essentially meaning the Euclidean distance in color space between the source color and the selected colorant, is recorded, and is in effect distributed or diffused to the image data of subsequent neighboring pixels. In brief, this diffusion of each error to neighboring pixels influences the decision of which primary colorant to use in those neighboring pixels. The overall effect is, over a reasonably large number of pixels, an optical blend resulting in the desired source color.

Recently, particularly in the technology of ink-jet printing, there has been developed a hardware option in which selectably available colorants are provided beyond the usual pure primary colorants of cyan, magenta, yellow, and black. For example, some designs may include colorants of additive colors, such as red, blue, and green, in addition to the subtractive colors of cyan, magenta, and yellow. Other designs may include colorants representing a lighter or diluted version of another primary color, such as a light-cyan, which is 50% lighter than regular-cyan. The use of such additional colorants can enhance and/or enlarge the available gamut associated with a particular apparatus. One particular additional colorant, which will be the subject of the embodiment of the present invention described below, is, in addition to a pure black K colorant, a grey LK colorant. The grey LK colorant is a 50% dilution of black K ink. Selectable use of the grey LK ink will, of course, be helpful in the creation of monochrome halftones, such as black-and-white photographs, and also for the creation of non-saturated colors. Other additional colorants which will be discussed include light-cyan LC, light-magenta LM, and light-yellow LY.

These additional colorants, such as light-cyan or grey, are considered intra-gamut colorants. More specifically, the pure colorants such as cyan or magenta define a gamut and are, therefore, disposed at the corners of a cube 10 representing a color space of the gamut. The intra-gamut colorants, on the other hand, are disposed within the color space of the gamut. In other words, the intra-gamut colorants are along the edges, on the faces, or within the cube 10. While this is useful for obtaining accurate representations of colors, such as pastels, which are near the white or grey areas of a gamut, use of such intra-gamut colorants can interfere with the error-diffusion colorant selection process.

For example, an error-diffusion selection process may occasionally decide that an intra-gamut colorant such as grey LK, or a mixture of on-edge colorants such as light-cyan LC plus light-magenta LM (i.e., a color on one of the faces of the color cube), is desirable for a particular pixel in an image. In either of these situations, the resulting error from selection of the intra-gamut color, when diffused to influence the selection of colorants for neighboring pixels, may require the selection of colors which are out of the gamut. These out-of-gamut colors would be physically impossible to obtain with the available colorants. In other words, selection of a colorant either inside the gamut or on the face of the gamut may lead to errors which require selection of colorants outside the gamut, which are not available. Consequently, artifacts from large errors may occur.

To illustrate the drawback of the prior art system, FIG. 1 illustrates a cube 10 representing a color space CS1. The color space characterizes a gamut indicating a three-dimensional volume including every combination of the various primary colorants available for a particular printing apparatus. Starting at the lower corner W of FIG. 1, a white value indicates no colorant is placed for a particular pixel in an image to be printed. Three (3) axes extend from the lower corner W. Numeric values are associated with points along each of the three axes. More specifically, the value of zero (0) is assigned to the lower corner W and the value of 255 is assigned to the point of full color saturation along the different directions. These three directions represent contributions of three primary colorants, yellow Y, cyan C, and magenta M. The more a particular colorant is apparent, the farther along any particular axis and, consequently, the higher the value (up to 255) of the particular color along the axis in the color space.

A color desired to be printed in an image is indicated as a source color at the location marked X. The color X is disposed near the inside surface of the center of the face within the gamut CS1 formed by the points marked C, W, M, B. Therefore, the color X is closest to the location in color space of grey LK. The particular problem addressed by the present invention occurs when selecting which colorants to use in order to obtain this desired source color X by a combination of, in this case, cyan C, grey LK, magenta M, light-cyan LC, and light-magenta LM.

Under the basic well known technique of error diffusion to select colorants, a source color X desired to be printed is located in color space, and the colorant selected for a particular pixel is the colorant which is closest, by Euclidean distance, to the source color X in color space. Once the particular colorant is selected, the distance, here indicated as d, is calculated in terms of both magnitude and direction, and then the error, which is the negative of the distance (same magnitude, opposite direction), is then diffused to influence the color selection decision for a certain subset of neighboring pixels, as is known in the art. In other words, a fixed proportion such as "Floyd-Steinberg weights" of the error is applied to each of a plurality of the neighboring pixels, thereby altering the position of the source color for the neighboring pixels.

The contribution of the diffused error from the colorant selection in one pixel influences the color selection for a neighboring pixel. Notably, the colorant selection for the neighboring pixel may be different than it originally would have been because the error from a previous pixel selection has been added to it. The specific desired overall color (such as a shade of brown) is obtained as the cumulative result of this error diffusion over a reasonably large number of pixels. Of course, the present discussion is directed to obtaining a desired source color over a fairly large set of pixel areas. In "busy" images, where the desired source color changes abruptly across the image, an error-diffusion technique will have a different effect on the selection of colorants.

When an intra-gamut colorant such as LK is selected by the error diffusion algorithm as the closest available color, the error, meaning the negative of the distance to the source color X, which is diffused to influence the selection of other pixels, occasionally causes a practical problem. When this error is added to the source color X for the selection of a colorant for a neighboring pixel, the resulting new source color, indicated as X= in FIG. 1, is pushed effectively out of the gamut CS1. This pushing of the new source color out of the gamut comes about because the selected colorant LK is located toward the center of the gamut, and thus the resulting error vector is pointed directly out of the gamut CS1. If this error-diffused new source color X= is the color that would serve as the new source color from which a colorant would be selected in the neighboring pixel, it would be impossible to select a combination of primary colors such as C, M, Y, etc. which could possibly simulate this color, and the whole error-diffusion process is compounded. A similar problem arises if the error diffusion algorithm chooses a color on one of the faces (e.g., LC+LM, LC+LY, LM+LY, LK+LC, LK+LM, and LK+LY) as the closest available color.

The present invention is directed to an error-diffusion system, specifically for use with an apparatus wherein intra-gamut colorants, such as grey, or lighter or diluted versions of primary color colorants, are available. Furthermore, the present invention provides a new and improved apparatus and method which overcomes the above-referenced problems and others.

SUMMARY OF THE INVENTION

A method selects colorants, from a plurality of colorants defining a color space, for a set of pixels. The method obtains actual colors approximating desired colors for the respective pixels. The actual colors are output by an output apparatus. The method performs a variety of steps for each pixel in the set. Specifically, the method determines the desired color. Next, undercolor removal is performed for the desired color, thereby dividing the desired color into first and second components. A scalar error diffusion is performed for the first component of the desired color, resulting in a first component of the actual color. A vector error diffusion is performed for the second component of the desired color, resulting in a second component of the actual color. The vector error diffusion uses a reduced set of combinations achievable from the plurality of colorants. The first and second components of the actual color are combined to achieve the final actual color. The final actual color is output by the output apparatus.

In accordance with one aspect of the invention, the step of performing undercolor removal includes performing full undercolor removal.

In accordance with another aspect of the invention, the color space includes at least one colorant for outputting at least one level of a black. The step of performing undercolor removal includes identifying a level of black as the first component of the desired color and identifying respective levels of other colorants defining the color space as the second component of the desired color.

In accordance with a more limited aspect of the invention, the color space is defined by eight colorants. The determining step includes determining components of the eight colorants included in the desired color.

In accordance with even a more limited aspect of the invention, the color space includes at least two colorants for outputting respective levels of the black, at least two colorants for outputting a dark and a light level of at least two of a cyan, a magenta, and a yellow, and at least one colorant for outputting the other of the cyan, the magenta, and the yellow. The step of performing vector error diffusion includes selecting a closest achievable color not including two of the light levels.

In accordance with another aspect of the invention, the outputting step includes printing the actual color on a color printer.

One advantage of the present invention is that unavailable colorants either inside the color space or on the "face" of the color space are not chosen for vector error diffusion.

Another advantage of the present invention is that artifacts, occurring from large errors when a vector error diffusion algorithm chooses these unavailable colorants, are decreased.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

DETAILED DESCRIPTION OF THE PREFERRED EMBODIMENTS

Figure 1:
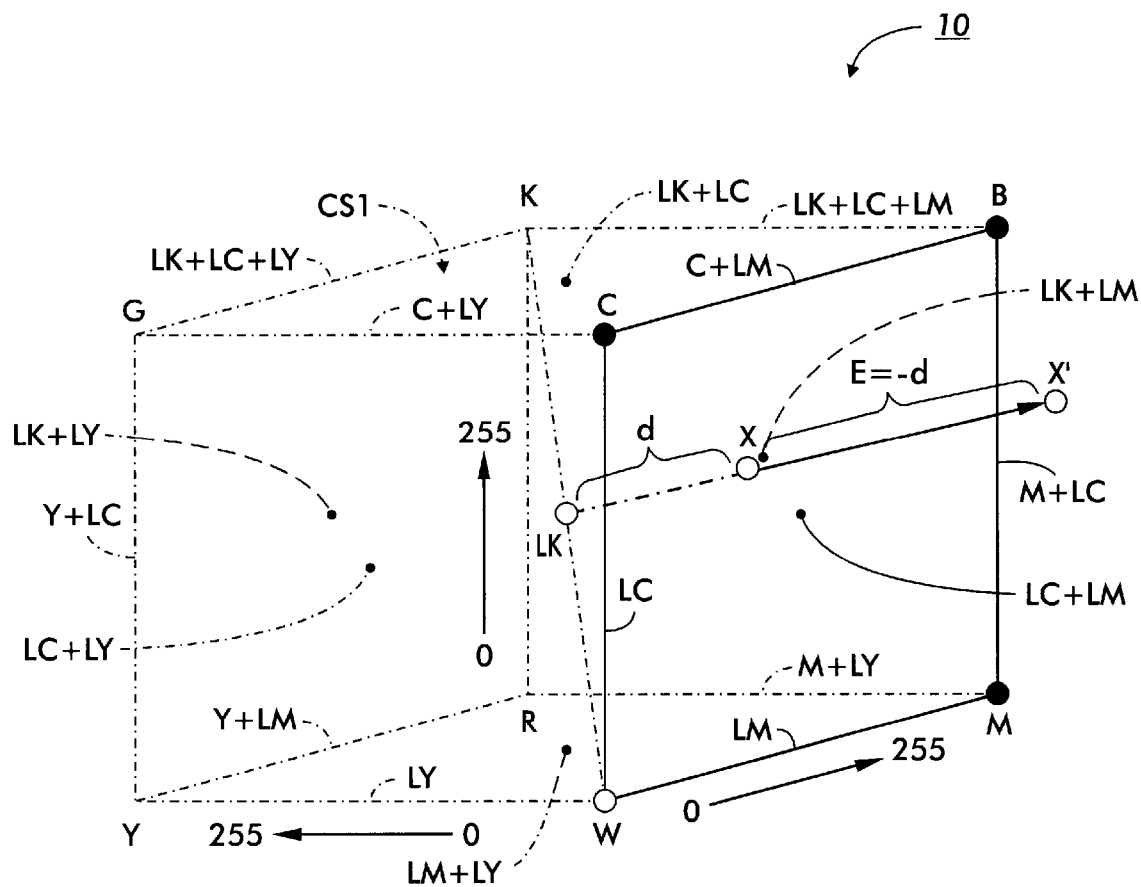
FIG. 1 illustrates an implementation of vector error diffusion according to a Prior Art system.
Figure 2:
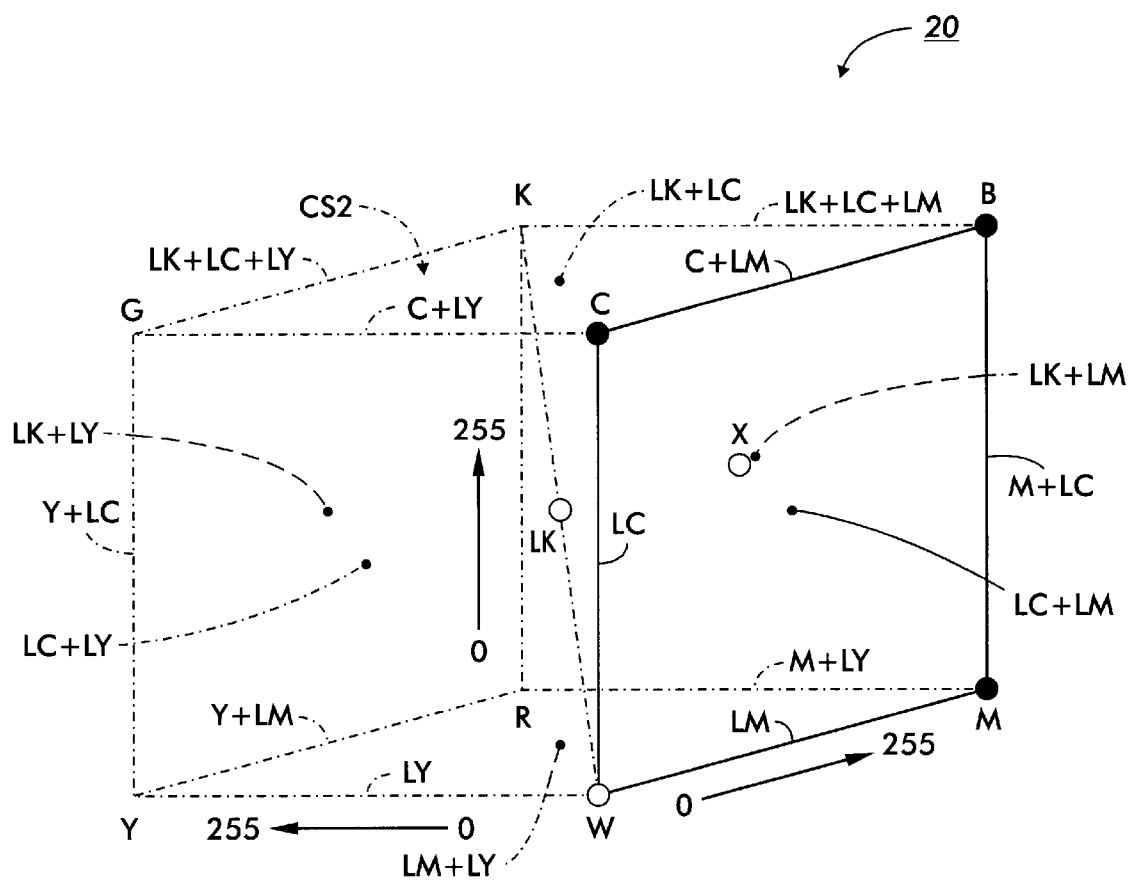
FIG. 2 a color space according to the present invention.

FIG. 2 illustrates a cube 20 representing a color space CS2 disclosed in the preferred embodiment of the present invention. The color space CS2 characterizes a gamut similar to that shown in FIG. 1.

It is well known to provide a printing apparatus, such as an ink-jet or an electrophotographic laser printer, having selectable values for C, M, Y, and K. However, it is also well known to provide an apparatus in which one or more further colorants are available. These additional colorants are in effect located within the gamut or color space CS2 defined by the primary C, M, Y, and K colorants. The additional colorants disclosed in the preferred embodiment of the present invention include light-cyan LC, light-magenta LM, light-yellow LY, and light-black LK (i.e., grey). In the illustrated preferred embodiment, grey LK is a colorant located in color space midway along the axis between W and K, going through the center of the cube 20. The grey LK represents, for example, a diluted black ink. The light-cyan LC, light-magenta LM, and light-yellow LY colorants are located along edges of the cube 20. With these printers, one may select, for printing in a particular pixel area in an image to be printed, a colorant which is effectively located inside, along an edge, or in the center of one of the faces of the gamut CS2.

In the cube 20 of the present invention, the nine (9) primary colorants provided:

white W,
cyan C,
magenta M,
yellow Y,
black K,
light-cyan LC,
light-magenta LM,
light-yellow LY, and
light-black (i.e., grey) LK.

Note that the colors white W, cyan C, magenta M, yellow Y, and black K are located at five (5) respective corners of the cube 20. It is to be understood that white W is not actually a colorant, but results when none of the inks for the primary colorants C, M, Y, K, LC, LM, LY, and LK are printed on a paper. The colors light-cyan LC, light-magenta LM, and light-yellow LY, are located along edges of the cube 20, and the color grey LK is located in the center of the cube 20.

The colors red R, green G, and blue B, located at the three (3) remaining corners of the cube 20, are formed from combinations of cyan C, magenta M, and yellow Y as follows:

red R (i.e., magenta plus yellow),
green G (i.e., cyan plus yellow), and
blue B (i.e., cyan plus magenta).

The colors described thus far represent all eight (8) corners of the cube 20, midpoints of three (3) edges of the cube 20, along with the center of the cube 20. Midpoints of the remaining nine (9) edges of the cube 20 are achieved by combining the nine (9) available colorants as follows:

cyan plus light-magenta C+LM,
cyan plus light-yellow C+LY,
magenta plus light-cyan M+LC,
magenta plus light-yellow M+LY,
yellow plus light-cyan Y+LC,
yellow plus light-magenta Y+LM,
grey plus light-cyan plus light-magenta LK+LC+LM,
grey plus light-cyan plus light-yellow LK+LC+LY, and
grey plus light-yellow plus light-magenta LK+LY+LM.

The six (6) faces of the cube 20 are achieved by combining the available colorants as follows:

light-cyan plus light-magenta LC+LM,
light-cyan plus light-yellow LC+LY,
light-magenta plus light-yellow LM+LY,
grey plus light-cyan LK+LC,
grey plus light-magenta LK+LM, and
grey plus light-yellow LK+LY.

The method of the present invention detects situations in which the selection of a particular intra-gamut colorant would cause the out-of-gamut problem described above. More specifically, if such a situation is detected, the error diffusion algorithm influences the selection of colorants to avoid this out-of-gamut problem.

Figure 3:
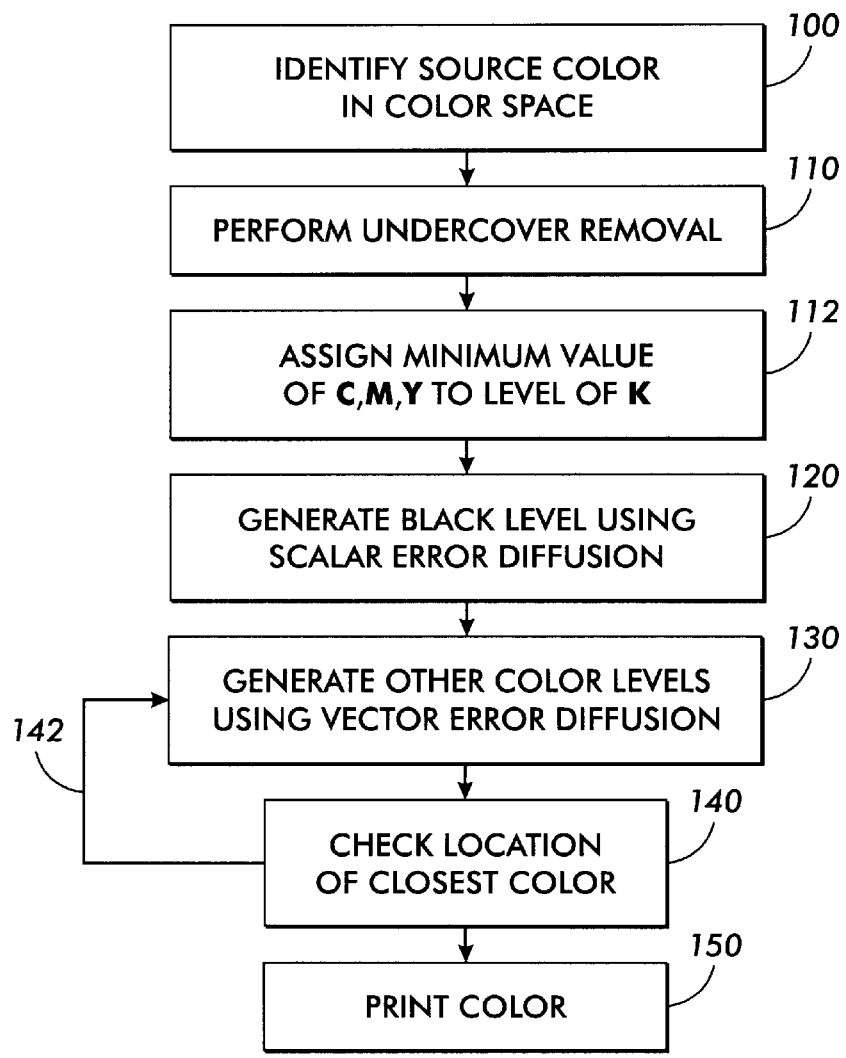
FIG. 3 illustrates a method of error diffusion according to the present invention.

FIG. 3 is a flowchart illustrating the method of the present invention, as practiced on the selection of a colorant for one pixel in an image desired to be printed. It will be noted, of course, that even though a particular source color is desired to be printed, the issue for an individual pixel is to choose which primary colorant to place in that pixel. To obtain the source color, of course, further requires selection of colorants in neighboring pixels so that the desired optical blend simulating the source color is obtained. However, in the present invention the method of selection is carried out on a pixel-by-pixel basis, and the overall effect of the present method over a large number of pixels is to obtain the desired source color by selecting a relatively large number of pixels of different colorants.

Figure 4:
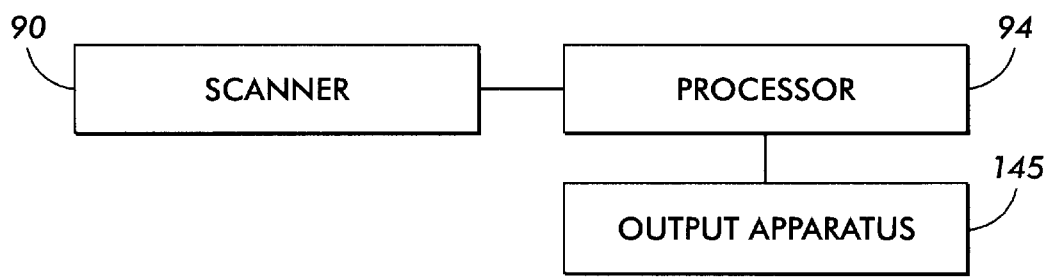
FIG. 4 an error diffusion system according to the present invention.

With reference to FIGS. 3 and 4, the source color is identified from the original image data by a scanner 90 and located in color space CS2 by a processor 94 in a step 100 shown in FIG. 3. It is assumed that the source color X already includes a diffused error incorporated by an error-diffusion process applied on a previously processed neighboring pixel, as is typical in error-diffusion algorithms.

As discussed above, the source color X is represented in terms of the available primary colorants. In other words, X=(r C, s M, t Y) where r, s, and t are numbers ranging from 0 to 255. Undercolor removal is performed by the processor 94 in a step 110. This process examines the values of r, s, and t, which represent the levels of the respective colorants (i.e., cyan, magenta, and yellow). Then, in a step 112, the processor 94 assigns the minimum value of r, s, and t to u (i.e., u=Min (r, s, t)). Next, the value of u is subtracted from each of the values r, s, and t, yielding r', s', and t', respectively (i.e., r'=r−u, s'=s−u, and t'=t−u). The value of u represents the level of black ink that must be added to the newly calculated levels of cyan, magenta, and yellow in order to achieve the source color. In other words, X=(r C, s M, t Y)=(r' C, s' M, t' Y, u K), where at least one of r', s', and t' is zero (0).

The practice of undercolor removal and grey component replacement is well known in the art. The preferred embodiment described above discloses the simplest form of undercolor removal (i.e., full undercolor removal). More specifically, full undercolor removal determines the minimum value of r, s, and t (which represent the levels of cyan, magenta, and yellow, respectively). That value is then subtracted from each of r, s, and t, and assigned to u, which represents the level of black.

While the preferred embodiment discloses full undercolor removal, it is to be understood that other, more general forms of undercolor removal are also contemplated. For example, in other implementations of undercolor removal, some function of the minimum of r, s, and t is subtracted from each of r, s, and t, and some, potentially different, function of the minimum is used to calculate u. These alternate implementations of undercolor removal are feasible with the present invention so long as relatively little black is left in the color component including cyan, magenta, and yellow.

The process of undercolor removal effectively replaces a grey component of the cyan, magenta, and yellow portions of the source color X with a certain level of black K ink. Consequently, the source color X is considered to have two parts. The first part is generated by the processor 94, in a step 120, using scalar error diffusion for the black K and grey LK inks, along with the color white W, to achieve the required level of black. The second part is generated by the processor 94, in a step 130, using vector error diffusion for the cyan C, magenta M, yellow Y, light-cyan LC, light-magenta LM, and light-yellow LY inks, along with the color white W, to achieve the required level of cyan, magenta, and yellow.

Since the grey component of the source color X has been identified and separated from the cyan, magenta, and yellow colors, the vector error diffusion disclosed in the present invention only utilizes achievable colors on the surface and/or corners of the cube 20. In other words, the diffusion algorithm will not choose a color inside the color space CS2. More specifically, these colors need not be considered when the algorithm is choosing the closest color. As long as enough of the grey component of the color has been removed, the method will not choose black or the intermediate grey even if those colors are left in the set.

As described above, it has been noted that undesirable artifacts result when a vector error diffusion algorithm chooses colors in the centers of the faces of the cube 20. Therefore, although these colors are achievable using the available colorants, the diffusion algorithm, in essence, ignores these colors if they are chosen as the closest available color to the source color X. In other words, step 140 checks if the closest available color selected by the vector error diffusion algorithm is on one of the cube faces. This determination is done by checking the components which make up the closest available color selected by the algorithm. More specifically, step 140 checks if the closest available color includes exactly two light-inks (i.e., light-cyan, light-magenta, and light-yellow). If two of the light-inks are found, control returns to step 130 via loop 142 to select the next available closest color. This process is repeated until the color selected by the algorithm does not contain exactly two light-inks (i.e., the color is not on one of the faces of the cube 20). Alternatively, any color made up of two light-inks is eliminated from consideration when the method is searching for the closest available color.

The color is output to an output apparatus 145 in a step 150. In the preferred embodiment, the output apparatus 145 is a color printer. However, it is contemplated that the output apparatus 145 be a color facsimile machine or other color producing apparatus.

It is noted that three faces of the cube 20 include grey LK as one of the two light-inks (i.e., grey plus light-cyan LK+LC, grey plus light-magenta LK+LM, and grey plus light-yellow LK+LY). Therefore, the black components of these colors are processed according to the scalar error diffusion algorithm of step 120 and the color components, which are along an edge of the cube 20, are processed according to the vector error diffusion algorithm of step 130. Consequently, the errors resulting from processing these three colors are processed in the undercolor removal procedure of step 110 and will not be selected in the vector error diffusion process of step 130.

Although the CMYK color space is illustrated in the preferred embodiment of FIG. 2, it is to be understood that other color spaces, for example, L*a*b* or XYZ color space are also contemplated.

In conclusion, the present invention is a method of vector error diffusion which uses full-undercover removal to avoid choosing colors in the middle of the color cube 20. The error diffusion method of the present invention also avoids choosing colors in the centers of the cube faces, thereby resulting in a superior picture having a reduced number of visible artifacts.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. A method of selecting colorants, from a plurality of colorants defining a color space, for a set of pixels, to obtain actual colors approximating desired colors for the respective pixels, the actual colors being output by an output apparatus, comprising the steps of, for each pixel:

determining the desired color;

performing undercolor removal for the desired color, thereby dividing the desired color into first and second components;

performing a scalar error diffusion for the first component of the desired color, resulting in a first component of the actual color;

performing a vector error diffusion for the second component of the desired color, the vector error diffusion using a reduced set of combinations achievable from the plurality of colorants, resulting in a second component of the actual color;

combining the first and second components of the actual color to achieve the final actual color; and outputting the final actual color by the output apparatus.

2. The method as described in claim 1, wherein the step of performing undercolor removal includes:

performing full undercolor removal.

3. The method of selecting colorants according to claim 1, wherein the color space includes at least one colorant for outputting at least one level of a black, the step of performing undercolor removal including:

identifying a level of black as the first component of the desired color; and identifying respective levels of other colorants defining the color space as the second component of the desired color.

4. The method of selecting colorants according to claim 3, wherein the color space is defined by eight colorants, the determining step including:

determining components of the eight colorants included in the desired color.

5. The method of selecting colorants according to claim 4, wherein the color space includes at least two colorants for outputting respective levels of the black, at least two colorants for outputting a dark and a light level of at least two of a cyan, a magenta, and a yellow, and at least one colorant for outputting the other of the cyan, the magenta, and the yellow, the step of performing vector error diffusion including:

selecting a closest achievable color not including two of the light levels.

6. The method of selecting colorants according to claim 1, wherein the outputting step includes:

printing the actual color on a color printer.

7. A system for selecting colorants, from a plurality of colorants defining a color space, for a set of pixels, to obtain actual colors approximating desired colors for the respective pixels, comprising:

means for determining the desired color of a pixel;

means for performing undercolor removal for the desired color, thereby dividing the desired color into first and second components;

means for performing a scalar error diffusion for the first component of the desired color, resulting in a first component of the actual color;

means for performing a vector error diffusion for the second component of the desired color, the vector error diffusion using a reduced set of combinations achievable from the plurality of colorants, resulting in a second component of the actual color, the first and second components of the actual color being combined to achieve the final actual color; and means for outputting the final actual color.

8. The system for selecting colorants according to claim 7, wherein:

the color space includes at least one colorant for outputting at least one level of a black; and the means for performing undercolor removal identifies a level of black as the first component of the desired color; and the means for performing undercolor removal identifies a level of other colorants defining the color space as the second component of the desired color.

9. The system for selecting colorants according to claim 8, wherein the color space includes at least two colorants for outputting respective levels of the black, at least two colorants for outputting a dark and a light level of at least two of a cyan, a magenta, and a yellow, and at least one colorant for outputting the other of the cyan, the magenta, and the yellow, the means for performing vector error diffusion selecting a closest achievable color not including two of the light levels.

10. The system for selecting colorants according to claim 9, wherein the means for outputting the final actual color is a color facsimile machine.

11. The system as described in claim 7, wherein the means for performing undercolor removal performs full undercolor removal.

12. A method of error diffusion for selecting colorants, from a plurality of colorants defining a color space, to obtain an actual color which represents a desired color for respective pixels, the actual colors being output by an output apparatus, comprising the steps of:

determining the desired color for a pixel;

performing undercolor removal for the desired color, thereby dividing the desired color into first and second components;

performing a scalar error diffusion for the first component of the desired color, resulting in a first component of the actual color;

performing a vector error diffusion for the second component of the desired color, the vector error diffusion including:

calculating an error, the error being a negative of a distance in the color space between a closest available colorant in a subset of the plurality of colorants and the desired color; and adding the error to at least one neighboring, unprocessed pixel;

combining the first and second components of the actual color to achieve the final actual color; and outputting the final actual color by the output apparatus.

13. The method of error diffusion according to claim 12, wherein the calculating step includes:

for each of the plurality of colorants, calculating a potential error, the potential error being a negative of a distance in the color space between the respective colorant and the desired color; and selecting the error as a smallest potential error.

14. The method of error diffusion according to claim 12, wherein the color space includes at least one colorant for outputting at least one level of a black, the step of performing undercolor removal including:

identifying a level of black as the first component of the desired color; and identifying respective levels of other colorants defining the color space as the second component of the desired color.

15. The method of selecting colorants according to claim 12, wherein the determining step includes:

determining a diffused error from a previously processed neighboring pixel.

16. The method of selecting colorants according to claim 12, wherein the outputting step includes:

outputting the actual color on a color printer.

17. The method of error diffusion according to claim 12, wherein the color space is defined by colorants including a cyan, a magenta, a yellow, a black, a light-black and at least one of a light-cyan, a light-magenta, and a light-yellow, the determining step including:

determining components of the eight colorants included in the desired color.

18. The method of error diffusion according to claim 17, the step of performing vector error diffusion including:

calculating the error from the desired color to the closest available colorant in the subset of the plurality of colorants, the subset not including colors containing exactly two of the light-cyan, light-magenta, and light-yellow colorants.

* * * * *